United States Patent
Yokokawa et al.

(10) Patent No.: US 9,771,076 B2
(45) Date of Patent: Sep. 26, 2017

(54) VEHICLE CONTROL DEVICE AND VEHICLE CONTROL METHOD

(71) Applicant: TOYOTA JIDOSHA KABUSHIKI KAISHA, Toyota-shi (JP)

(72) Inventors: Takahiro Yokokawa, Susono (JP); Masami Kondou, Niwa-gun (JP); Youhei Hareyama, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 137 days.

(21) Appl. No.: 14/797,952

(22) Filed: Jul. 13, 2015

(65) Prior Publication Data

US 2016/0052520 A1 Feb. 25, 2016

(30) Foreign Application Priority Data

Aug. 20, 2014 (JP) .................................. 2014-167205

(51) Int. Cl.
| | |
|---|---|
| *B60W 30/18* | (2012.01) |
| *B60W 10/02* | (2006.01) |
| *B60W 10/06* | (2006.01) |
| *B60W 10/101* | (2012.01) |
| *F02D 29/02* | (2006.01) |

(52) U.S. Cl.
CPC ...... *B60W 30/18072* (2013.01); *B60W 10/02* (2013.01); *B60W 10/023* (2013.01); *B60W 10/06* (2013.01); *B60W 10/101* (2013.01); *B60W 30/18109* (2013.01); *B60W 2030/1809* (2013.01); *B60W 2510/182* (2013.01); *B60W 2540/12* (2013.01); *B60W 2710/027* (2013.01); *B60W 2710/1005* (2013.01); *F02D 29/02* (2013.01)

(58) Field of Classification Search
CPC ... B60W 2510/182; B60W 2030/1809; B60W 2030/18081; B60W 10/023; B60W 10/06; B60W 2710/027
USPC ......................................................... 477/181
See application file for complete search history.

(56) References Cited

U.S. PATENT DOCUMENTS

| | | | |
|---|---|---|---|
| 2003/0004635 A1* | 1/2003 | Kamiya | ................ B60W 10/06 701/112 |
| 2015/0307103 A1* | 10/2015 | Kuroki | .................... F16H 61/21 701/70 |

FOREIGN PATENT DOCUMENTS

| | | | | |
|---|---|---|---|---|
| JP | 7-224913 | | 8/1995 | |
| JP | H07224913 | * | 8/1995 | ............. F16H 61/18 |
| JP | 2006-83830 A | | 3/2006 | |
| JP | 2012-172578 A | | 9/2012 | |

* cited by examiner

*Primary Examiner* — Stacey Fluhart
(74) *Attorney, Agent, or Firm* — Oblon, McClelland, Maier & Neustadt, L.L.P.

(57) ABSTRACT

A vehicle control device includes a controller configured to allow cranking of an engine by increasing clutch torque at a time a deceleration request is detected during free running in which a vehicle is allowed to run in a state in which a clutch is disengaged and the engine is stopped, and makes an increasing rate of the clutch torque larger at a time when a negative pressure of a brake booster is small than at a time when the negative pressure of the brake booster is large.

3 Claims, 3 Drawing Sheets

VEHICLE CONTROL DEVICE AND VEHICLE CONTROL METHOD

CROSS-REFERENCE TO RELATED APPLICATION

The present application claims priority to and incorporates by reference the entire contents of Japanese Patent Application No. 2014-167205 filed in Japan on Aug. 20, 2014.

BACKGROUND OF THE INVENTION

1. Field of the Invention

The present invention relates to a vehicle control device and a vehicle control method for allowing cranking of an engine by increasing clutch torque when there is a deceleration request during free running.

2. Description of the Related Art

Technology of detecting negative pressure (vacuum) of a brake booster during idling stop and restarting an engine when the negative pressure of the brake booster is lower than a predetermined threshold is conventionally known. According to such technology, it is possible to always keep the negative pressure of the brake booster at an optimal value and inhibit a driver from feeling discomfort at the time of brake operation due to insufficient negative pressure of the brake booster.

In the above-described conventional technology, it is required to set a threshold of the negative pressure of the brake booster at which the engine is restarted to a high value to some extent in consideration of various road surfaces such as a slope with steep gradient. That is to say, the negative pressure higher than that on a flatland is required on the slope with the steep gradient, so that it is required to set the threshold to the high value for the slope with the steep gradient.

However, when the threshold is set high, the negative pressure of the brake booster is increased by unnecessary restart of the engine even on the flatland on which the vehicle may be stopped without a sense of discomfort with the small negative pressure. Therefore, frequency of the restart of the engine increases and fuel consumption decreases.

From such a background, technology of decreasing the threshold of the negative pressure of the brake booster when the vehicle stops on the flatland as compared to a case in which this stops in a place other than the flatland is suggested (refer to Japanese Laid-open Patent Publication No. 2006-83830).

Technology of restarting an engine by performing push starting to increase an engine speed by engaging a clutch when restarting operation of the engine is performed during idling stop while running (free running) is known (refer to Japanese Laid-open Patent Publication No. 2012-172578). Therefore, it is considered to secure negative pressure of a brake booster by restarting the engine by the push starting when a driver performs decelerating operation during the free running. However, required braking force is larger in general while the vehicle runs than that when the vehicle stops. Therefore, even when the engine is restarted by the push starting, the negative pressure of the brake booster might be insufficient and the driver might feel that the braking force is insufficient. That is to say, there is a room for improvement of a method of restarting the engine when the negative pressure of the brake booster is decreased during the free running.

There is a need for a vehicle control device and a vehicle control method capable of inhibiting the driver from feeling that the braking force is insufficient when the driver performs the decelerating operation during the free running.

SUMMARY OF THE INVENTION

It is an object of the present invention to at least partially solve the problems in the conventional technology.

According to one aspect of the present invention, there is provided a vehicle control device including a controller configured to allow cranking of an engine by increasing clutch torque at a time a deceleration request is detected during free running in which a vehicle is allowed to run in a state in which a clutch is disengaged and the engine is stopped, and make an increasing rate of the clutch torque larger at a time a negative pressure of a brake booster is small than at a time the negative pressure of the brake booster is large.

According to another aspect of the present invention, there is provided a vehicle control method including: allowing cranking of an engine by increasing clutch torque at a time a deceleration request is detected during free running in which a vehicle is allowed to run in a state in which a clutch is disengaged and the engine is stopped; and making an increasing rate of the clutch torque larger at a time a negative pressure of a brake booster is small than at a time the negative pressure of the brake booster is large.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A configuration of a vehicle control device according to an embodiment of the present invention and a vehicle control method thereof are hereinafter described in detail with reference to the drawings.

Configuration of Vehicle

A configuration of a vehicle to which the vehicle control device according to the embodiment is applied is first described with reference to FIG. 1.

Figure 1:
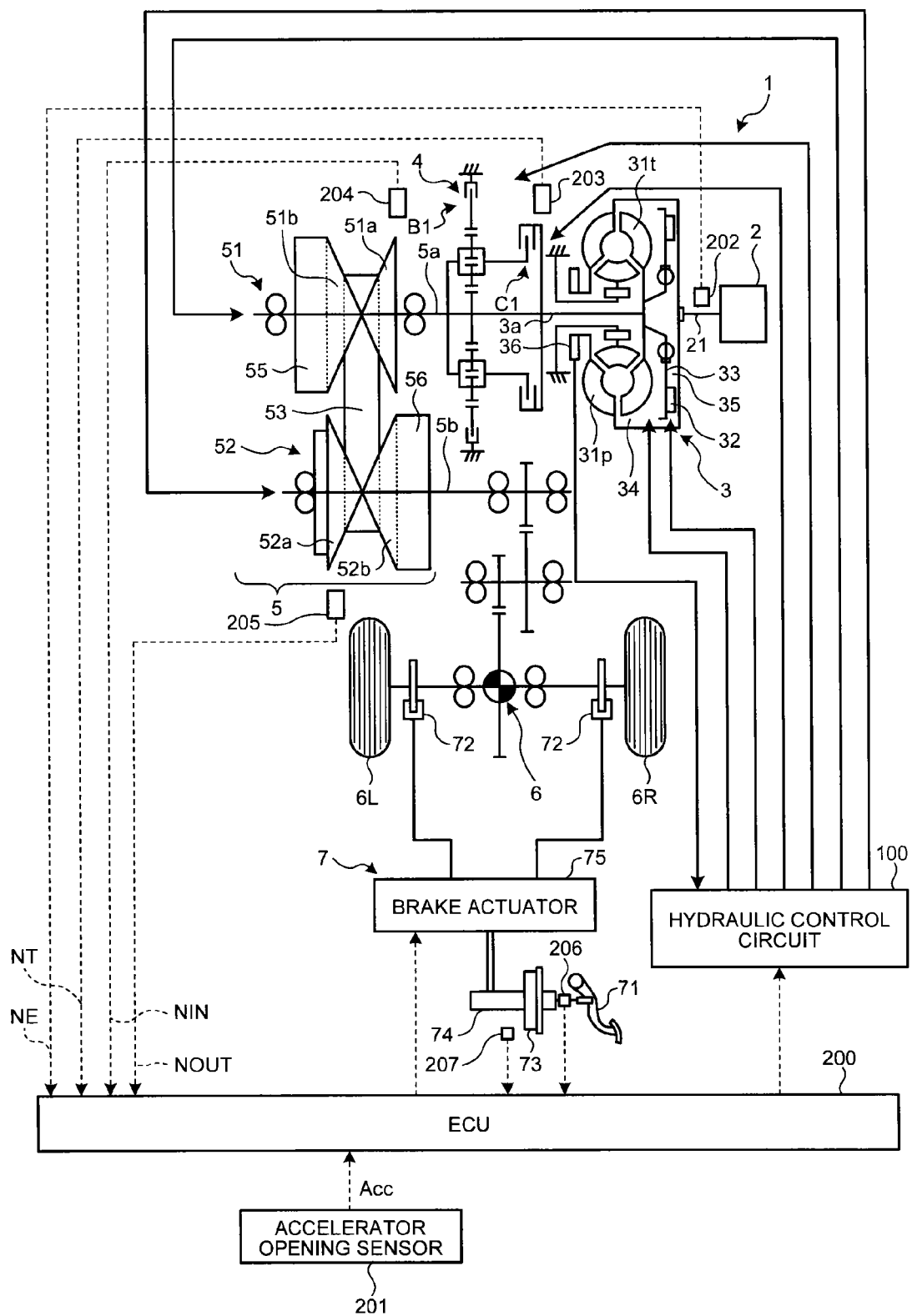
FIG. 1 is a schematic diagram illustrating a configuration of a vehicle to which a vehicle control device according to an embodiment of the present invention is applied and the vehicle control device.

FIG. 1 is a schematic diagram of the configuration of the vehicle to which the vehicle control device according to the embodiment is applied and the vehicle control device. As illustrated in FIG. 1, a vehicle 1 to which the vehicle control device according to the embodiment is applied is provided with an engine 2, a torque converter 3, a forward/reverse switching device 4, a belt-type continuously variable transmission (CVT) 5, a differential mechanism 6, and a braking device 7.

The engine 2 reciprocates a piston by combustion of mixed gas of fuel gas and air in a combustion chamber and rotates a crankshaft 21 through a connecting rod, thereby transmitting power to the torque converter 3. The power of the engine 2 transmitted to the torque converter 3 is transmitted to the differential mechanism 6 through the forward/reverse switching device 4, an input shaft 5a, and the CVT 5 to be distributed to right and left driving wheels 6R and 6L.

The torque converter 3 provided with a pump impeller 31p coupled to the crankshaft 21 and a turbine impeller 31t coupled to the forward/reverse switching device 4 through a turbine shaft 3a transmits the power through fluid. A lockup clutch 32 is provided between the pump impeller 31p and the turbine impeller 31t. An engagement side oil chamber 34 and a disengagement side oil chamber 35 separated by a piston 33 are formed in the torque converter 3.

The lockup clutch 32 is engaged or disengaged by switch of hydraulic supply to the engagement side oil chamber 34 and the disengagement side oil chamber 35. When the lockup clutch 32 is engaged, the crankshaft 21 is directly coupled to the turbine shaft 3a and the power output from the engine 2 is directly transmitted to the CVT 5 without intervention of the fluid in the torque converter 3. In contrast, when the lockup clutch 32 is disengaged, the power output from the engine 2 is transmitted to the CVT 5 through the fluid.

An oil pump 36 operating according to rotation of the pump impeller 31p is provided on the pump impeller 31p. The oil pump 36 formed of a mechanical oil pump such as a gear pump, for example, supplies hydraulic pressure to a hydraulic control circuit 100 to be described later.

The forward/reverse switching device 4 provided on a power transmission path between the torque converter 3 and the CVT 5 is formed mainly of a double pinion type planetary gear device. The forward/reverse switching device 4 is provided with a forward clutch C1 and a reverse brake B1 each of which is formed of a hydraulic frictional engagement device frictionally engaged by a hydraulic cylinder.

The forward/reverse switching device 4 is put into an integrally rotating state by the engagement of the forward clutch C1 and the disengagement of the reverse brake B1. At that time, a forward power transmission path is established and driving force in a forward direction is transmitted to the CVT 5. In contrast, when the reverse brake B1 is engaged and the forward clutch C1 is disengaged, the forward/reverse switching device 4 establishes a reverse power transmission path to rotate the input shaft 5a in a direction opposite to that of the turbine shaft 3a. According to this, driving force in a reverse direction is transmitted to the CVT 5. When both the forward clutch C1 and the reverse brake B1 are disengaged, the forward/reverse switching device 4 is put into a neutral state (blocking state) in which power transmission is blocked.

The CVT 5 is provided with a primary pulley 51 on an input side having a variable effective diameter, a secondary pulley 52 on an output side having a variable effective diameter, and a metallic transmission belt 53 wound around the pulleys. The CVT 5 transmits the power through frictional force between the primary and secondary pulleys 51 and 52 provided on the input shaft 5a and an output shaft 5b, respectively, and the transmission belt 53. The CVT 5 is connected to the engine 2 through the forward/reverse switching device 4 and the torque converter 3.

The primary and secondary pulleys 51 and 52 are provided with fixed sheaves 51a and 52a fixed to the input shaft 5a and output shaft 5b and movable sheaves 51b and 52b provided so as to be relatively unrotatable around shaft centers and movable in axial directions of the input shaft 5a and output shaft 5b, respectively.

The primary pulley 51 changes a winding radius of the transmission belt 53 by changing a groove width thereof. The secondary pulley 52 generates belt clamping pressure to clamp the transmission belt 53. The transmission belt 53 is wound around V-shaped pulley grooves formed by the fixed sheaves 51a and 52a and movable sheaves 51b and 52b.

The primary and secondary pulleys 51 and 52 are provided with hydraulic actuators 55 and 56 which generate thrust (primary thrust and secondary thrust) for moving the movable sheaves 51b and 52b in the axial directions, respectively. The hydraulic actuators 55 and 56 are formed of hydraulic cylinders, for example. The secondary pulley 52 may be configured such that return spring is provided in the hydraulic cylinder and spring thrust by the return spring is added to the secondary thrust.

The primary and secondary pulleys 51 and 52 continuously change the groove widths of the pulley grooves by control of the hydraulic pressure supplied to the hydraulic actuators 55 and 56, respectively. According to this, the winding radius of the transmission belt 53 is changed and a transmission ratio is continuously changed.

The braking device 7 is a device which generates braking force on the driving wheels 6L and 6R according to operation of a brake pedal 71 and is provided with a wheel cylinder 72, a brake booster 73, a master cylinder 74, and a brake actuator 75. In this embodiment, for the purpose of description, the braking device 7 is described only for the driving wheels 6L and 6R on a front side, but it is configured such that the braking force by the braking device 7 similarly acts on the driving wheels on a rear side.

The wheel cylinder 72 as a hydraulic braking unit is provided on each of the driving wheels 6L and 6R. The brake booster 73 amplifies operational force of the brake pedal 71 according to stepping of the brake pedal 71. The master cylinder 74 converts the amplified operational force (pedal force) to the hydraulic pressure which generates the braking force of the vehicle 1. The brake actuator 75 controls the hydraulic pressure transmitted from the master cylinder 74 to the wheel cylinder 72 of each of the driving wheels 6L and 6R.

Configuration of Vehicle Control Device

The configuration of the vehicle control device according to the embodiment is next described with reference to FIG. 1.

As illustrated in FIG. 1, the vehicle control device is provided with a hydraulic control circuit 100 and an ECU (electronic control unit) 200. The ECU 200 functions as a controller.

The hydraulic control circuit 100 controls the hydraulic pressure supplied to the torque converter 3, the forward/reverse switching device 4, and the CVT 5 according to a control signal from the ECU 200. Specifically, the hydraulic control circuit 100 controls the hydraulic pressure (line pressure) supplied from the oil pump 36 and is adjusted by a regulator valve. The hydraulic control circuit 100 controls engaging force of the lockup clutch 32, that is to say, transmission torque. The lockup clutch 32 is controlled into any one of a disengaged state, an engaged state, and a slip state (state between the disengaged state and engaged state) according to magnitude of the transmission torque.

The hydraulic control circuit 100 controls the hydraulic pressure supplied to the forward clutch C1 or the reverse brake B1. The hydraulic control circuit 100 controls the hydraulic pressure supplied to the hydraulic actuator 55 of the primary pulley 51. That is to say, the hydraulic control circuit 100 controls the transmission ratio of the CVT 5 through the control of the hydraulic pressure. The hydraulic control circuit 100 controls the hydraulic pressure supplied to the hydraulic actuator 56 of the secondary pulley 52. That is to say, the hydraulic control circuit 100 controls the belt clamping pressure through the control of the hydraulic pressure.

The ECU 200 is formed of a microcomputer provided with a CPU (central processing unit), a RAM (random access memory), a ROM (read only memory), an input/output interface and the like, for example. The CPU uses a temporary storage function of the RAM and executes signal processing according to a computer program stored in advance in the ROM. Various control constants and various maps are stored in advance in the ROM.

Various sensors including an accelerator opening sensor 201, an engine speed sensor 202, a turbine rotational speed sensor 203, a primary pulley rotational speed sensor 204, a secondary pulley rotational speed sensor 205, a brake sensor 206, a negative pressure sensor (vacuum sensor) 207 and the like are connected to the ECU 200.

The accelerator opening sensor 201 detects an operational amount (accelerator opening Acc) of an accelerator pedal of the vehicle 1 and outputs an electric signal indicating the detected accelerator opening Acc to the ECU 200.

The engine speed sensor 202 detects a rotational speed of the crankshaft 21 to which rotation of the engine 2 is transmitted as an engine speed NE and outputs an electric signal indicating the detected engine speed NE to the ECU 200.

The turbine rotational speed sensor 203 detects a rotational speed of the turbine shaft 3a of the torque converter 3, that is to say, the turbine rotational speed NT and outputs an electric signal indicating the detected turbine rotational speed NT to the ECU 200.

The primary pulley rotational speed sensor 204 detects a rotational speed of the primary pulley 51, that is to say, a primary pulley rotational speed NIN and outputs an electric signal indicating the detected primary pulley rotational speed NIN to the ECU 200.

The secondary pulley rotational speed sensor 205 detects a rotational speed of the secondary pulley 52, that is to say, a secondary pulley rotational speed NOUT and outputs an electric signal indicating the detected secondary pulley rotational speed NOUT to the ECU 200.

The brake sensor 206 detects a stepping amount of the brake pedal 71 and outputs an electric signal indicating the detected stepping amount of the brake pedal 71 to the ECU 200.

The negative pressure sensor (vacuum sensor) 207 detects negative pressure (vacuum) of the brake booster 73 and outputs an electric signal indicating the detected negative pressure of the brake booster 73 to the ECU 200.

The ECU 200 controls the brake actuator 75 and the hydraulic control circuit 100 based on detection signals input from the above-described various sensors. The ECU 200 may perform free running by controlling each unit of the vehicle 1. In the free running, the ECU 200 automatically stops the engine 2 while the vehicle 1 runs and allows the vehicle 1 to run by inertia in order to improve fuel consumption. In the free running, the forward clutch C1 is disengaged when the engine 2 stops in order to inhibit transmission of shock due to the stop of the engine 2. In other words, the free running is such that the power transmission path between the engine 2 and the CVT 5 is blocked by the disengagement of the forward clutch C1 while the vehicle 1 runs and inertia running of the vehicle 1 is allowed in a state in which the engine 2 is stopped. According to the free running, the fuel consumption in the engine 2 stops, so that it is possible to improve the fuel consumption.

The vehicle control device having such configuration inhibits a driver from feeling that the braking force is insufficient because sufficient deceleration cannot be obtained due to insufficient negative pressure of the brake booster 73 when the driver operates the brake pedal 71 during the free running by executing a vehicle control process to be described hereinafter. A flow of the vehicle control process by the vehicle control device according to the embodiment is hereinafter described with reference to FIGS. 2 to 4.

Vehicle Control Process

Figure 2:
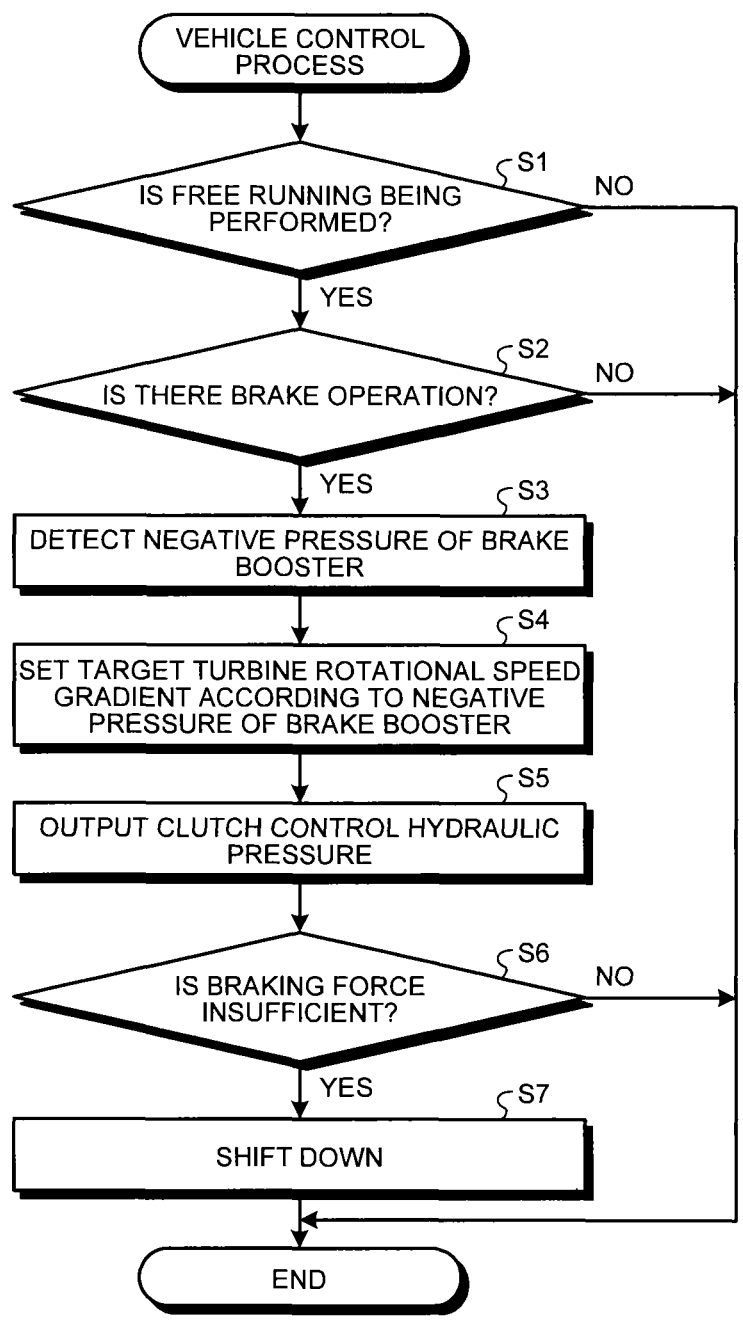
FIG. 2 is a flowchart illustrating a flow of a vehicle control process according to the embodiment of the present invention.
Figure 3:
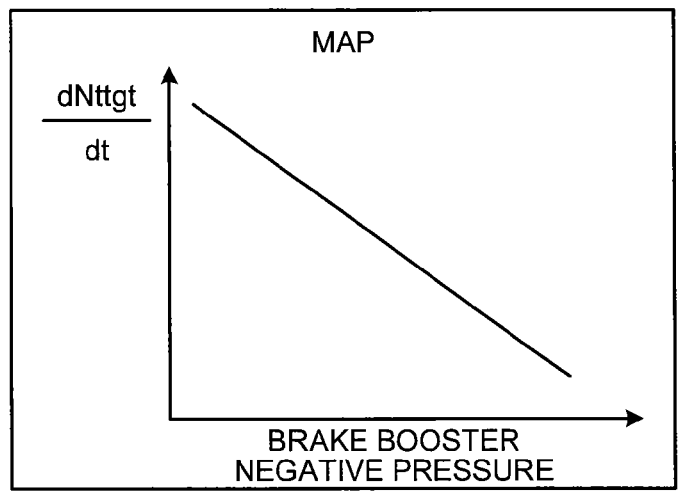
FIG. 3 is a view illustrating an example of a map illustrating a relationship between negative pressure of a brake booster and an increasing rate of a target turbine rotational speed.
Figure 4A:
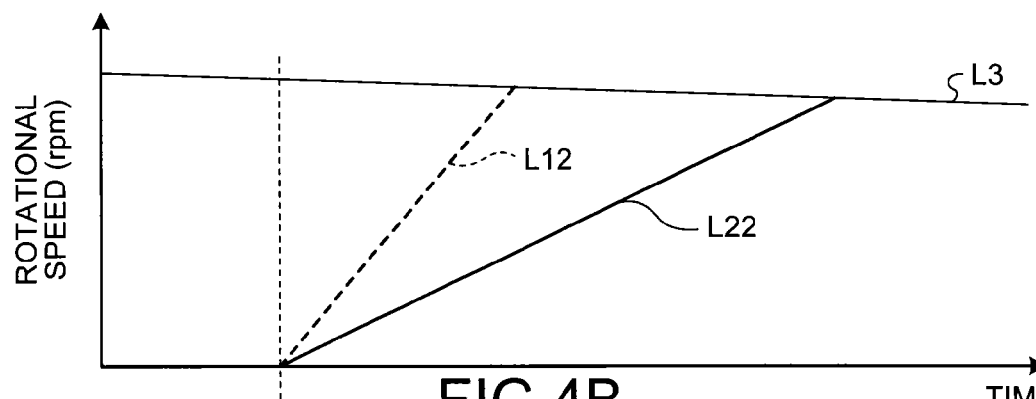
FIG. 4A and FIG. 4B are timing charts for illustrating the vehicle control process according to the embodiment of the present invention.
Figure 4B:
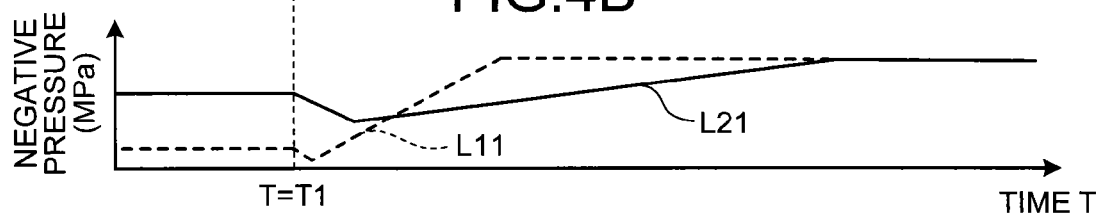

FIG. 2 is a flowchart illustrating the flow of the vehicle control process according to the embodiment. FIG. 3 is a view illustrating an example of a map illustrating a relationship between the negative pressure of the brake booster and an increasing rate of a target turbine rotational speed. FIG. 4A and FIG. 4B are timing charts for illustrating the vehicle control process according to the embodiment.

The flowchart illustrated in FIG. 2 starts at timing at which an ignition switch of the vehicle 1 is switched from an off state to an on state and the vehicle control process shifts to a process at step S1. The vehicle control process is repeatedly executed in each predetermined control period while the ignition switch of the vehicle 1 is in the on state.

In the process at step S1, the ECU 200 determines whether the free running is currently performed. The ECU 200 sets a flag indicating whether the free running is performed from an off state to an on state while the free running is performed. Therefore, the ECU 200 may determine whether the free running is currently performed by determining whether the flag is in the on state. As a result of the determination, when the free running is not currently performed (No at step S1), the ECU 200 finishes a series of vehicle control processes. In contrast, when the free running is currently performed (Yes at step S1), the ECU 200 shifts the vehicle control process to a process at step S2.

In the process at step S2, the ECU 200 determines whether the brake pedal 71 is operated based on the electric signal output from the brake sensor 206. As a result of the determination, when the brake pedal 71 is operated (Yes at step S2), the ECU 200 shifts the vehicle control process to a process at step S3. In contrast, when the brake pedal 71 is not operated (No at step S2), the ECU 200 finishes a series of vehicle control processes.

In the process at step S3, the ECU 200 detects the negative pressure of the brake booster 73 based on the electric signal output from the negative pressure sensor 207. Then, the process at step S3 is completed and the vehicle control process shifts to a process at step S4.

In the process at step S4, the ECU 200 sets the increasing rate of a target turbine rotational speed Nttgt (target turbine rotational speed gradient) based on the negative pressure of the brake booster 73 detected in the process at step S3. In detail, clutch engagement control to control the supplied hydraulic pressure to the forward clutch C1 is performed based on a physical equation represented by following equation (1).

$$Tt = Tc + I\frac{d}{dt}Nttgt \quad (1)$$

Herein, a term Tt of a left part of equation (1) represents torque (power) output from the engine 2 to be input to an input side engagement member of the forward clutch C1 through the torque converter 3. A first term Tc of a right part represents clutch torque being a transmission torque capacity which may be transmitted to a downstream side of the power transmission path of the forward clutch C1, that is to say, the CVT 5. A second term of the right part represents loss torque (inertia torque) required for rotating the input side engagement member and an output side engagement member of the forward clutch C1. The inertia torque is represented as a product of rotary inertia moment I and a time change rate of the target turbine rotational speed Nttgt.

In the clutch engagement control, the clutch torque Tc is determined by subtracting the inertia torque based on the target turbine rotational speed Nttgt as a loss from the input torque Tt based on the above-described physical equation. The clutch torque Tc is converted to clutch hydraulic pressure supplied to the forward clutch C1 and engagement operation of the forward clutch C1 is controlled based on the derived clutch hydraulic pressure. The input torque Tt may be derived based on information regarding an operational state of the engine 2 such as the engine speed NE detected by the engine speed sensor 202, for example.

While the free running is performed, the engine 2 stops, so that the input torque Tt is substantially 0. Therefore, the clutch torque Tc is proportional to the increasing rate of the target turbine rotational speed Nttgt as represented by following equation (2). Therefore, in this embodiment, the ECU 200 makes the increasing rate of the target turbine rotational speed Nttgt larger as the negative pressure of the brake booster 73 detected in the process at step S3 is lower. In this embodiment, the ECU 200 reads the increasing rate of the target turbine rotational speed Nttgt corresponding to the negative pressure of the brake booster 73 detected in the process at step S3 from the map in which the increasing rate of the target turbine rotational speed Nttgt becomes larger as the negative pressure of the brake booster 73 is lower as illustrated in FIG. 3. Meanwhile, the negative pressure of the brake booster 73 is intended to mean a negative value indicating difference between absolute pressure of the brake booster 73 and atmospheric pressure. Therefore, when the negative pressure of the brake booster 73 is small, this means that the difference between the absolute pressure of the brake booster 73 and the atmospheric pressure is small and the absolute pressure of the brake booster 73 is large.

$$Tc = Tt - I\frac{d}{dt}Nttgt \quad (2)$$
$$\cong -I\frac{d}{dt}Nttgt$$

More specifically, a case in which the negative pressure of the brake booster 73 after time (time T=T1) at which the brake pedal 71 is operated is indicated by line L11 and a case in which this is indicated by line L21 as illustrated in FIG. 4B are considered. In these cases, the negative pressure indicated by line L11 is lower than the negative pressure indicated by line L21. Therefore, when the negative pressure of the brake booster 73 is indicated by line L11, the increasing rate (climbing gradient) of the target turbine rotational speed Nttgt is made larger than the increasing rate of the target turbine rotational speed Nttgt (line L22 illustrated in FIG. 4A) when the negative pressure of the brake booster 73 is indicated by line L21 as indicated by line L12 in FIG. 4A. Meanwhile, line L3 in FIG. 4A indicates time change in the primary pulley rotational speed NIN.

Making the increasing rate of the target turbine rotational speed Nttgt larger as the negative pressure of the brake booster 73 is lower steeply increases the clutch torque Tc. Since the clutch torque Tc steeply increases, the forward clutch C1 is fully engaged early and the engine speed NE increases early, so that it is possible to secure the negative pressure of the brake booster 73 required for obtaining the braking force early. Since the inertia torque of the driving wheels 6L and 6R may be transmitted to the crankshaft 21 of the engine 2 early, it is possible to obtain deceleration early. As a result, it is possible to inhibit the driver from feeling that the braking force is insufficient when the driver operates the brake pedal 71 during the free running. Meanwhile, although the increasing rate of the target turbine rotational speed Nttgt monotonously increases as the negative pressure of the brake booster 73 decreases as illustrated in FIG. 3 in this embodiment, it is also possible that the increasing rate of the target turbine rotational speed Nttgt gradually increases as the negative pressure of the brake booster 73 decreases or the increasing rate of the target turbine rotational speed Nttgt may monotonously increase when the negative pressure of the brake booster 73 is not higher than a predetermined value. Then, the process at step S4 is completed and the vehicle control process shifts to a process at step S5.

In the process at step S5, the ECU 200 calculates the clutch torque Tc from the increasing rate of the target turbine rotational speed Nttgt set in the process at step S4 by using equation (2) described above. The ECU 200 derives the hydraulic pressure supplied to the forward clutch C1 from the calculated clutch torque Tc and controls the engagement operation of the forward clutch C1 based on the hydraulic pressure derived by controlling the hydraulic control circuit 100. The vehicle 1 is decelerated by the process. Then, the process at step S5 is completed and the vehicle control process shifts to a process at step S6.

In the process at step S6, the ECU 200 determines whether the braking force is insufficient relative to a target value. It may be determined whether the braking force is insufficient relative to the target value by comparing actual braking force obtained from the deceleration of the vehicle 1 detected by a deceleration sensor with target braking force obtained from the stepping amount of the brake pedal 71 detected by the brake sensor 206. As a result of the determination, when the braking force is sufficient relative to the target value (No at step S6), the ECU 200 finishes a series of vehicle control processes. In contrast, when the braking force is insufficient relative to the target value (Yes at step S6), the ECU 200 shifts the vehicle control process to a process at step S7.

In the process at step S7, the ECU 200 shifts down the CVT 5. Shifting down the CVT 5 increases the rotational speed of the CVT 5 and may add the inertia torque obtained by this to the braking force. As a result, it is possible to further inhibit the driver from feeling that the braking force is insufficient when the driver operates the brake pedal 71 during the free running. Then, the process at step S7 is completed and a series of vehicle control processes are finished.

As is clear from the above-description, in the vehicle control process according to the embodiment, the ECU 200 makes the increasing rate of the clutch torque Tc larger by making the increasing rate of the target turbine rotational speed Nttgt larger when the negative pressure of the brake booster 73 is small than when this is large, so that it is possible to inhibit the driver from feeling that the braking force is insufficient when the driver operates the brake pedal 71 during the free running.

According to the vehicle control device and the vehicle control method, an increasing rate of clutch torque becomes larger when negative pressure of a brake booster is small than when this is large, so that it is possible to increase an engine speed early by fully engaging a clutch early, thereby securing the negative pressure of the brake booster required for obtaining braking force early. Since inertia torque of a driving wheel is transmitted to a crankshaft of an engine early, it is possible to obtain deceleration early. According to this, it is possible to inhibit a driver from feeling that the braking force is insufficient when the driver performs decelerating operation during free running.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device comprising:
    a controller configured to
        allow cranking of an engine by increasing clutch torque of a clutch at a time a deceleration request is detected during free running in which a vehicle is allowed to run in a state in which the clutch is disengaged and the engine is stopped, and
        make an increasing rate of the clutch torque larger at a first time when a negative pressure of a brake booster is a first value than at a second time when the negative pressure of the brake booster is a second value, the first value being less than the second value,
    wherein the controller is configured to make the increasing rate of the clutch torque larger by making an increasing rate of a target turbine rotational speed larger at the first time when the negative pressure of the brake booster is the first value than at the second time when the negative pressure of the brake booster is the second value.

2. The vehicle control device according to claim 1, wherein the controller is configured to shift down a continuously variable transmission at a time a braking force is insufficient relative to a target value.

3. A vehicle control method comprising:
    allowing cranking of an engine by increasing clutch torque of a clutch at a time a deceleration request is detected during free running in which a vehicle is allowed to run in a state in which the clutch is disengaged and the engine is stopped; and
    making an increasing rate of the clutch torque larger at a first time when a negative pressure of a brake booster is a first value than at a second time when the negative pressure of the brake booster is a second value, the first value being less than the second value,
    wherein the increasing rate of the clutch torque is made larger by making an increasing rate of a target turbine rotational speed larger at the first time when the negative pressure of the brake booster is the first value than at the second time when the negative pressure of the brake booster is the second value.

* * * * *